(12) United States Patent
Zhang (10) Patent No.: US 11,222,610 B2
(45) Date of Patent: Jan. 11, 2022

(54) PROTECTION CIRCUIT, POWER SUPPLY CIRCUIT, AND DISPLAY PANEL

(71) Applicant: HKS CORPORATION LIMITED, Guangdong (CN)

(72) Inventor: Liang Zhang, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/734,874

(22) PCT Filed: Dec. 17, 2018

(86) PCT No.: PCT/CN2018/121564
§ 371 (c)(1),
(2) Date: Dec. 3, 2020

(87) PCT Pub. No.: WO2020/113665
PCT Pub. Date: Jun. 11, 2020

(65) Prior Publication Data
US 2021/0134238 A1    May 6, 2021

(30) Foreign Application Priority Data

Dec. 3, 2018 (CN) .......................... 201811465795.8

(51) Int. Cl.
*G09G 3/36* (2006.01)
*H02H 5/04* (2006.01)

(52) U.S. Cl.
CPC .......... *G09G 3/3688* (2013.01); *H02H 5/042* (2013.01); *G09G 2330/045* (2013.01)

(58) Field of Classification Search
CPC . G09G 3/3688; G09G 2330/045; H02H 5/042
See application file for complete search history.

(56) References Cited

U.S. PATENT DOCUMENTS

2006/0152875 A1   7/2006 Chen et al.
2009/0278832 A1*  11/2009 Cho ..................... G09G 3/3648
                                                 345/211

(Continued)

FOREIGN PATENT DOCUMENTS

CN    1928975 A    3/2007
CN    101577103 A  11/2009

(Continued)

OTHER PUBLICATIONS

The First Chinese Office Action dated Nov. 29, 2019; Appln. No. 201811465795.8.

(Continued)

*Primary Examiner* — Kenneth B Lee, Jr.

(57) ABSTRACT

A protection circuit (10), a power supply circuit, and a display panel. The protection circuit (10) comprises a feedback circuit (100) and a current adjusting circuit (200). The reaction circuit (100) is used for receiving a supply voltage, adjust the first general resistance thereof according to the temperature of a data drive chip, and generate a reaction voltage according to the supply voltage and the adjusted first resistance. The current adjusting circuit (200) is used for receiving the supply voltage and the reaction voltage, and generate and output a driving current according to the reaction voltage and the supply voltage, the driving current decreasing following a rise in the temperature of the data drive chip; when the driving current is reduced, the thermal energy power consumption of the data drive chip is reduced so as to prevent burnout due to the temperature at the interior thereof being too high.

16 Claims, 3 Drawing Sheets

(56) References Cited

U.S. PATENT DOCUMENTS

2009/0289965 A1* 11/2009 Kurokawa ........... G09G 3/3406
345/690
2012/0049740 A1    3/2012 Kang et al.
2015/0054815 A1    2/2015 Toyoda et al.

FOREIGN PATENT DOCUMENTS

| CN | 101587697 A | 11/2009 |
| CN | 103167675 A | 6/2013 |
| CN | 103500557 A | 1/2014 |
| CN | 103606354 A | 2/2014 |
| CN | 203660874 U | 6/2014 |
| CN | 205140491 U | 4/2016 |
| CN | 107578739 A | 1/2018 |
| CN | 207664610 U | 7/2018 |
| CN | 108831406 A | 11/2018 |

OTHER PUBLICATIONS

The International Search Report dated May 31, 2019; PCT/CN2018/121564.
Written Opinion of the International Searching Authority dated May 31, 2019; PCT/CN2018/121564.

* cited by examiner

PROTECTION CIRCUIT, POWER SUPPLY CIRCUIT, AND DISPLAY PANEL

CROSS REFERENCES TO RELATED DISCLOSURE

The present disclosure claims priority to Chinese patent disclosure No. 201811465795.8, entitled "Protection Circuit and power supply circuit" filed on Dec. 3, 2018, which is incorporated herein as a reference in its entirety.

FIELD

The disclosure relates to the field of display, in particular to a protection circuit, a power supply circuit and a display panel.

BACKGROUND

The statements herein merely provide background information related to the present disclosure and do not necessarily constitute prior art.

The liquid crystal television has the advantages of light weight, thin thickness, low power consumption and the like, and has been widely applied. With the improvement of the living standard of the domestic people, the liquid crystal television with large size, high resolution and high frame frequency is more popular. However, along with the increase of these technical indexes, the current of the data driving chip in the liquid crystal panel is larger and larger, the temperature is higher and higher, and it is closer to the temperature limit of the chip. Therefore, how to protect the data driving chip from being burnt out becomes a problem that needs to be solved currently.

At present, the over-current protection function is arranged in the power source integrated chip on the liquid crystal television driving board, but since the output of the current power source integrated chip is for all the data driving chips in the liquid crystal panel, the number of the data driving chips is large, and the power source IC can not accurately sense each current consumption status, so that the situation that an individual data driving chip is burnt often occurs.

SUMMARY

Based on this, the disclosure provides a protection circuit, a supply circuit and a display panel so as to solve the problem that the data driving chip is burnt due to excessively high internal temperature.

The embodiments of the present disclosure provide a protection circuit, including:

a feedback circuit, with a first input terminal being connected with a power source, and a second input terminal being grounded, and configured to receive a supply voltage, adjusting a first general resistance value of the feedback circuit according to a temperature of a data driving chip, and generating a feedback voltage according to the supply voltage and the adjusted first general resistance value; and, a current adjusting circuit, with a first input terminal being connected with the power source and the first input terminal of the feedback circuit, and a second input terminal being connected with the output terminal of the feedback circuit, and configured to receive the supply voltage and the feedback voltage, generating a driving current according to the feedback voltage and the supply voltage, and providing the driving current to the data driving chip, wherein, the driving current is reduced when the temperature of the data driving chip is increased.

In an embodiment, the feedback circuit including:

a first feedback branch, with a first input terminal being connected with the power source, and a second input terminal being grounded, and configured to receive the supply voltage, adjusting a third general resistance value of the first feedback branch according to the temperature of the data driving chip, generating a feedback control voltage according to the supply voltage and the adjusted third general voltage value, wherein, when the temperature of data driving chip is increased, the third general resistance value is reduced, and the feedback control voltage is reduced; and, a second feedback branch, with a first input terminal being connected with the power source and the first input terminal of the first feedback branch, the second input terminal being connected with the output terminal of the first feedback branch, and an output terminal being connected with the second input terminal of the current adjusting circuit, and configured to receive the supply voltage and the feedback control voltage output by the first feedback branch, adjusting a fourth general resistance value of its own according to the feedback control voltage, generating the feedback voltage according to the supply voltage and the adjusted fourth general resistance value, and outputting the feedback voltage to the current adjusting circuit, wherein, when the feedback control voltage is reduced, the feedback voltage is increased.

In one embodiment, the first feedback branch including:

a first resistance, with a terminal of the resistance being connected with the power source, and another terminal being connected with the second input terminal of the second feedback branch; and, a thermistor, with a terminal of the thermistor being connected with the second output terminal of the second feedback branch, and another terminal being grounded.

In some embodiments, the second feedback branch includes:

a second resistance, with a terminal being connected with the power source, and another terminal being connected with a second input terminal of the current adjusting circuit;

a third resistance, with a terminal of the third resistance terminal being connected with the second resistance and the second input terminal of the current adjusting circuit, and another terminal being connected with a drain of a first switch tube; and the first switch tube, with a grid being connected with the first resistance and the thermistor, the drain being connected with the third resistance, and a source being grounded.

In one embodiment, the thermistor is a negative temperature coefficient thermistor.

In one embodiment, the current adjusting circuit comprises a second switch tube with a grid being connected with the second resistance and the third resistance, a source being connected with the second resistance and the supply voltage, and a drain being connected with the data driving chip.

In one embodiment, the feedback circuit includes:

a first feedback branch, with a first input terminal being connected with the power source, and a second input terminal being grounded, and configured to receive the supply voltage, based on the temperature of the data driving chip, a third general resistance value of its own is adjusted, and based on the supply voltage and the adjusted third general resistance value, a feedback control voltage is generated, wherein when the temperature of the data driving chip is increased, the third general resistance value is reduced, the feedback control voltage is increased; and, a second feedback branch, with a first input terminal being connected with the power source, and the first input terminal of the first feedback branch, a second input terminal being connected with the output terminal of the first feedback branch, an output terminal is connected with the second input terminal of the current adjusting circuit, and being used for receiving the supply voltage and the feedback control voltage of the first feedback branch, based on the feedback control voltage, a fourth general resistance value of its own is adjusted, based on the supply voltage and the adjusted fourth general resistance value, the feedback voltage is generated, and it is output to the current adjusting circuit, wherein a feedback voltage is increased when the feedback control voltage is increased.

In one embodiment, the first feedback branch includes:

a thermistor, with a terminal being connected with the power source, another terminal being connected with the second input terminal of the second feedback branch; and a first resistance, with a terminal being connected with the first resistance and the second input terminal of the second feedback branch, a other terminal is grounded.

In one embodiment, the second feedback branch includes:

a second resistance, with a terminal being connected with the power source, another terminal being connected with the second input terminal of the current adjusting circuit;

a third resistance, with a terminal being connected with the power source, another terminal being connected with the second input terminal of the circuit adjusting circuit, another terminal being connected with the source electrode of the first switch tube; and the first switch tube, with a grid electrode being connected with the first resistance and the thermistor, a source electrode being connected with the third resistance, a drain electrode is grounded.

In one embodiment, the current adjusting circuit includes a second switch tube, with a grid electrode being connected with the second resistance and the third resistance, a source electrode being connected with the second resistance and the supply voltage, a drain electrode being connected with the data driving chip.

Base on a same disclosure idea, the present disclosure further provides a power supply circuit, the power supply circuit comprising a power source and a protection circuit; wherein the protection circuit includes:

a feedback circuit, with a first input terminal being connected with a power source, a second input terminal being grounded and being used for receiving a supply voltage, based on a temperature of a data driving chip, a first general resistance value of its own is adjusted, further, based on the supply voltage and the adjusted first general resistance value, a feedback voltage is generated; and, a circuit adjusting circuit, with a first input terminal being connected with the power source and the first input terminal of the feedback circuit, a second input terminal being connected with the output terminal of the feedback circuit and being used for receiving the supply voltage and the feedback voltage, based on the feedback voltage and the supply voltage, a driving current is generated and provided to the data driving chip, in particular the driving current is reduced when the temperature of the data driving chip is increased.

In one embodiment, a first feedback branch, with a first input terminal being connected with the power source, a second input terminal being grounded and being used for receiving the supply voltage, based on a temperature of the data driving chip, a third general resistance value of its own is adjusted, further, based on the the supply voltage and the adjusted third general resistance value, a feedback control voltage is generated. In particular, when the temperature of the data driving chip is increased, the third general resistance value is reduced, the feedback control voltage is reduced; and, a second feedback branch, with a first input terminal being connected with the power source and the first input terminal of the first feedback branch, a second input terminal being connected with the output terminal of the first feedback branch, an output terminal is connected with the second input terminal of the current adjusting circuit and being used for receiving the supply voltage and the feedback control voltage output by the first feedback branch, based on the feedback control voltage, a fourth general resistance value of its own is adjusted, based on the supply voltage and the adjusted fourth general resistance value, the feedback voltage is generated and output to the current adjusting circuit. In particular, the feedback voltage is increased when the feedback control voltage is reduced.

In one embodiment, the first feedback branch includes:

a first resistance, with a terminal being connected with the power source, another terminal being connected with the second input terminal of the second feedback branch; and, a thermistor, with a terminal being connected with the first resistance and the second input terminal of the second feedback branch, and an other terminal is grounded.

In one embodiment, The power supply circuit of claim 13, particularly the second feedback branch includes:

a second resistance, with a terminal being connected with the power source, another terminal being connected with the second input terminal of the current adjusting circuit;

a third resistance, with a terminal being connected with the second resistance and the second input terminal of the current adjusting circuit, another terminal being connected with a drain electrode of a first switch tube; and, the first switch tube, with a grid electrode being connected with the first resistance and the thermistor, the drain electrode is connected with the third resistance, a source electrode is grounded.

In one embodiment, the thermistor is a negative temperature coefficient thermistor.

In one embodiment, the feedback circuit includes:

a first feedback branch, a first terminal is connected with the power source, a second input terminal being grounded and being used for receiving the supply voltage, based on a temperature of the data driving chip, a third general resistance value of its own is adjusted, further, based on the supply voltage and the adjusted third general resistance value, a feedback control voltage is generated. Particularly, when the temperature of the data driving chip is increased, the third general resistance value is reduced, the feedback control voltage is increased; and a second feedback circuit, with a first input terminal being connected with the power source and the first input terminal of the first feedback branch, a second input terminal being connected with the output terminal of the first feedback branch, an output terminal is connected with the second input terminal of the current adjusting circuit and being used for receiving the supply voltage and the feedback control voltage output by the first feedback branch, based on the feedback control voltage, a fourth general resistance value of its own is adjusted, based on the supply voltage and the adjusted fourth general resistance value, a feedback voltage is generated and provided to the current adjusting circuit, particularly the feedback voltage is increased when the feedback control voltage is increased.

In one embodiment, the first feedback branch includes:

a thermistor, with a terminal being connected with the power source, another terminal being connected with the second input terminal of the second feedback branch; and, a first resistance, with a terminal being connected with the first resistance and the second input terminal of the second feedback branch, an other terminal is grounded.

In one embodiment, the second feedback branch includes:

a second resistance, with a terminal being connected with the power source, an other terminal if connected with the second input terminal of the current adjusting circuit;

a third resistance, with a terminal being connected with the second resistance and the second input terminal of the current adjusting circuit, another terminal being connected with a source electrode of a first switch tube; and, the first switch tube, with a grid electrode being connected with the first resistance and the thermistor, a source electrode being connected with the third resistance, a drain electrode is grounded.

In one embodiment, the current adjusting circuit includes a second switch tube, with a grid electrode being connected with the second resistance and the third resistance, a source electrode being connected with the second resistance and the supply voltage, a drain electrode being connected with the data driving chip.

Based on a same disclosure idea, the present disclosure further provides a display panel, including:

a display area, configured to display; and, a surrounding circuit area, configured to provide power and a driving signal to the display area, the surrounding circuit area includes a protection circuit;

particularly, The power supply circuit includes:

a feedback circuit, with a first input terminal being connected with a power source, a second input terminal being grounded and being used for receiving a supply voltage, based on a temperature of a data driving chip, a first general resistance value of its own is adjusted, further, based on the supply voltage and the adjusted first general resistance value, a feedback voltage is generated; and, a current adjusting circuit, with a first input terminal being connected with the power source, a second input terminal being connected with the output terminal of the feedback circuit and being used for receiving the supply voltage and the feedback voltage, based on the feedback voltage and the supply voltage, a driving current is generated and is further provided to the data driving chip, particularly the driving current is reduced when the temperature of the data driving chip is increased.

In summary, the present disclosure provides a protection circuit, a supply circuit and a display panel. The protection circuit includes a feedback circuit and a current adjusting circuit. A first input terminal of the feedback circuit is connected with a power source, a second input terminal of the feedback circuit is grounded and used for receiving a supply voltage, a first general resistance value of the feedback circuit is adjusted based on the temperature of the data driving chip, and a feedback voltage is generated based on the supply voltage and the adjusted first general resistance value. A first input terminal of the current adjusting circuit is connected with the power source and a first input terminal of the feedback circuit, the second input terminal of the current adjusting circuit is connected with an output terminal of the feedback circuit, the current adjusting circuit is used for receiving the supply voltage and the feedback voltage, generating a driving current based on the feedback voltage and the supply voltage, and providing the driving current to the data driving chip. In particular, the driving current is reduced along with the increase of the temperature of the data driving chip.

DETAILED DRAWINGS OF THE EMBODIMENTS

DETAILED DESCRIPTIONS OF THE EMBODIMENTS

In order to make the above objects, features and advantages of the present disclosure more comprehensible, detailed description of specific embodiments of the present disclosure is provided below in connection with the drawings. Numerous specific details are set forth in the following description in order to provide a thorough understanding of the present disclosure. The present disclosure can, however, be embodied in many other ways than those described herein, and a person skilled in the art can make similar improvements without departing from the meaning of the present disclosure, and therefore, the present disclosure is not limited by the specific implementations disclosed below.

Figure 1:
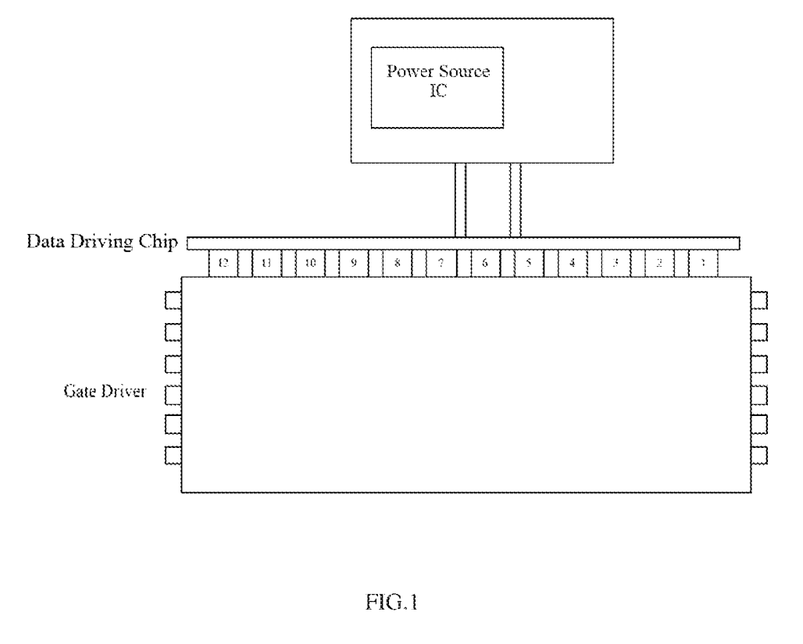
FIG. 1 is a schematic structural diagram of a driving architecture of a liquid crystal panel.

Referring to FIG. 1, in an overall driving architecture of a conventional ultra-high definition liquid crystal panel, double-side with 16 grid electrode driving chips and 12 data driving chips are provided. A driving board is responsible for power output and signal output, a power source IC (Integrated Circuit) generally has an over-current protection function, and an output current of a power source of the data driving chips is detected to judge whether to turn off the output of the power source However, the power source IC detects the general supply current of all 12 data driving chips, and if only an individual data driving chip have excessive current, the over-current protection of the power source IC can not be triggered. However, for an IC that is abnormal, it is possible to be burnt down quickly for reaching the temperature limit.

In order to solve the above problem, the present disclosure provides a protection circuit 10 including a feedback circuit 100 and a current adjusting circuit 200.

A first input terminal of the feedback circuit 100 is connected with a power source, a second input terminal of the feedback circuit 100 being grounded, the feedback circuit 100 is configured to receive a supply voltage, adjusting a first general resistance value of the feedback circuit 100 according to a temperature of a data driving chip, and generating a feedback voltage according to the supply voltage and the adjusted first general resistance value.

A first input terminal of the current adjusting circuit 200 is connected to the power source and a first input terminal of the feedback circuit 100. A second input terminal of the current adjusting circuit 200 is connected with an output terminal of the feedback circuit 100. The current adjusting circuit 200 is configured to receive the supply voltage and the feedback voltage, generating a driving current according to the feedback voltage and the supply voltage, and providing the driving current to the data driving chip, where the driving current is reduced along with the increase of the temperature of the data driving chip.

It can be appreciated that the feedback voltage is generated by the feedback circuit 100 according to the temperature of the data driving chip, so that the current adjusting circuit 200 adjusts the output driving current according to the feedback circuit 100, in particular, when the temperature of the data driving chip is increased, the driving current is reduced, and the power consumption of the data driving chip is reduced, so that the data driving chip is prevented from being burnt due to excessively high internal temperature.

In one embodiment, the feedback circuit 100 includes a first feedback branch 110 and a second feedback branch 120.

A first input terminal of the first feedback branch 110 is connected to the power source, and a second input terminal of the first feedback branch 110 is grounded. The first feedback branch 110 is configured to receive the supply voltage, adjusting a third general resistance value of the first feedback branch 110 according to the temperature of the data driving chip, and generating a feedback control voltage according to the supply voltage and the adjusted third general resistance value. In particular, when the temperature of the data driving chip is increased, the third general resistance value is reduced, and the feedback control voltage is reduced.

A first input terminal of the second feedback branch 120 is connected to the power source and the first input terminal of the first feedback branch 110, and a second input terminal of the second feedback branch 120 is connected to the output terminal. An output terminal of the second feedback branch 120 is connected to the second input terminal of the current adjusting circuit 200. The second feedback branch 120 is configured to receive the supply voltage and the feedback control voltage, adjusting a fourth general resistance value of the second feedback branch 120 according to the feedback control voltage, generating the feedback voltage according to the supply voltage and the adjusted fourth general resistance value, and outputting the feedback voltage to the current adjusting circuit 200. In particular, the feedback voltage is increased as the feedback control voltage is reduced.

In one embodiment, the first feedback branch 110 includes a first resistor R1 and a thermistor RTEMP.

Figure 2:
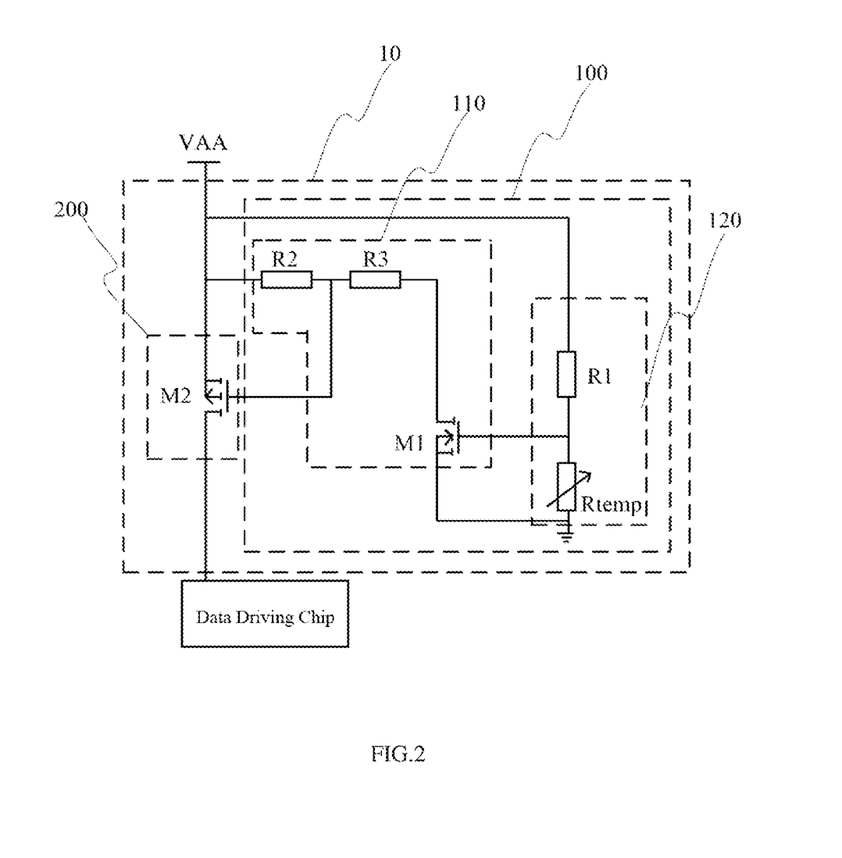
FIG. 2 is a schematic structural diagram of a protection circuit according to an embodiment of the present disclosure.

Referring to FIG. 2, one terminal of the first resistor R1 is connected with the power source, and the other terminal of the first resistor R1 is connected with the second input terminal of the second feedback branch 120.

One terminal of the thermistor RTEMP is connected with the first resistor R1 and the second input terminal of the second feedback branch 120, and the other terminal of the thermistor RTEMP is grounded.

It can be understood that when the temperature of the data driving chip is increased, a resistance value of the thermistor RTEMP is reduced, the third general resistance value (equals to the sum of resistance values of the first resistor R1 and the thermistor RTEMP) of the first feedback branch 110 is reduced, the voltage across the first feedback branch 110 is increased, the voltage across the first resistor R1 is increased, and the voltage across the thermistor RTEMP is reduced. The feedback control voltage is equal to the voltage across the thermistor RTEMP, so the feedback control voltage is reduced.

When the temperature of the data driving chip is reduced, the resistance value of the thermistor RTEMP is increased, the third general resistance of the first feedback branch 110 is increased, the voltage across the first feedback branch 110 is reduced, the voltage across the first resistor R1 is reduced, and the voltage across the corresponding thermistor RTEMP is increased. The feedback control voltage is equal to the voltage across the thermistor RTEMP, so the feedback control voltage is increased.

In the embodiment, the second feedback branch 120 includes a second resistor R2, a third resistor R3 and a first switch tube M1

One terminal of the second resistor R2 is connected with the power source, and the other terminal of the second resistor R2 is connected with the second input terminal of the current adjusting circuit 200.

One terminal of the third resistor R3 is connected with the second resistor R2 and the second input terminal of the current adjusting circuit 200, and the other terminal of the third resistor R3 is connected with a drain of the first switch tube M1.

A grid of the first switch tube M1 is connected with the first resistor R1 and the thermistor RTEMP, the drain of the first switch tube M1 is connected with the third resistor R3, and a source of the first switch tube M1 is grounded.

It can be understood that when the temperature of the data driving chip is increased, the feedback control voltage is reduced, a grid voltage of the first switch tube M1 is reduced, the conduction impedance of the first switch tube M1 is increased, the fourth general resistance value (equivalent to a sum of a resistance value of the second resistor R2, a resistance value of the third resistor R3 and an on-impedance value of the first switch tube M1) of the second feedback branch 120 is increased, the current flowing in the second feedback branch 120 becomes smaller and the voltage across the second feedback branch 120 becomes smaller. The feedback voltage is equal to the voltage across the third resistor R3 and the first switch tube M1, i.e., equal to a difference between the supply voltage and the voltage across the second resistor R2, so that when the voltage across the second resistor R2 becomes smaller, the feedback voltage is increased.

In the embodiment, the current adjusting circuit 200 includes a second switch tube M2, a grid is connected with the second resistor R2 and the third resistor R3, a source is connected with the second resistor R2 and the supply voltage, and a drain is connected with the data driving chip.

It can be understood that when the temperature of the data driving chip is increased, the feedback voltage is increased, a grid voltage of the second switch tube M2 is increased, and the conduction impedance of the second switch tube M2 is increased, so that the driving current output by the current adjusting circuit 200 is reduced, so that the power consumption of thermal energy in the data driving chip is reduced, so that the data driving chip can be restored to a normal temperature range through heat dissipation.

It can be understood that the resistance value of the thermistor RTEMP is reduced with an increasing temperature, and therefore the temperature of the data driving chip can be detected by using the thermistor RTEMP as a sensing device of temperature. In order to more accurately detect the temperature of the data driving chip, the thermistor RTEMP should be at least arranged inside the data driving chip, or the thermistor RTEMP is set at a position close to the data driving chip, and the position of other elements can be set according to actual needs. In the embodiment, the first resistor R1, the thermistor RTEMP and the first switch tube M1 are packaged inside the data driving chip.

In the embodiment, the first resistor R1, the second resistor R2 and the third resistor R3 are common resistances with fixed resistance values, the first switch tube M1 is a N-type field effect transistor, and the second switch tube M2 is a P-type field effect transistor. The first resistor R1 and the thermistor RTEMP are connected in series to form a voltage dividing circuit, to divide the input supply voltage VAA, the voltage across the thermistor RTEMP is equal to VAA*RTEMP/(RTEMP+R1), and the voltage across the thermistor RTEMP is used as the feedback control voltage to control conduction of the first switch tube M1.

When the data driving chip is in a normal temperature state, the RTEMP is larger, the voltage VRTEMP across the thermistor RTEMP is higher, the grid voltage of the first field effect transistor is high, the conduction impedance of the first field effect transistor is small, and the conduction condition is good. At this time, the power source is grounded through the second resistor R2, the third resistor R3 and the first switch tube M1, at this moment, the feedback voltage Vf=VAA*(R3+RN1)/(R2+R3+RN1), Vf<VAA, and the second switch tube M2 is turned on. The power source normally supplies power to the data driving chip. When the temperature of the data driving chip is increased, the RTEMP is reduced, the feedback control voltage is reduced, the conduction impedance of the first field effect transistor is increased, the feedback voltage Vf is increased, and a voltage difference between the grid of the second switch tube M2 and the source (equal to VAA-Vf) of the second switch tube M2 is reduced. The conduction impedance RN2 of the second switch tube M2 is increased, and the driving current output by the voltage adjusting circuit is reduced, thereby the thermal energy power consumption of the data driving chip is reduced.

When the data driving chip is close to be burnt due to abnormal conditions, the voltage across the thermistor RTEMP is close to 0, the first switch tube M1 is turned off, the feedback voltage is equal to the supply voltage, the voltage difference between the grid of the second switch tube M2 and the source of the second switch tube M2 is 0, the second switch tube M2 is also turned off. The power source no longer powers the data driving chip, the data driving chip stops working, and a serious consequence of burning is avoided.

In addition, the thermistor RTEMP has a self-recovery characteristic. When the temperature of the data driving chip is restored to normal, the resistance value of the thermistor RTEMP is restored to be normal, and the power source of the data driving chip is restored to normal. Therefore, the protection circuit 10 provided by the disclosure can automatically track temperature changes and adapt to different working states, thereby providing persistent protection for the data driving chip.

In the embodiment, the thermistor RTEMP is a negative temperature coefficient thermistor RTEMP. An resistance value of the negative temperature absorption thermistor RTEMP is reduced with the increase of the temperature, thereby the power consumption of the protection circuit 10 is reduced.

Figure 3:
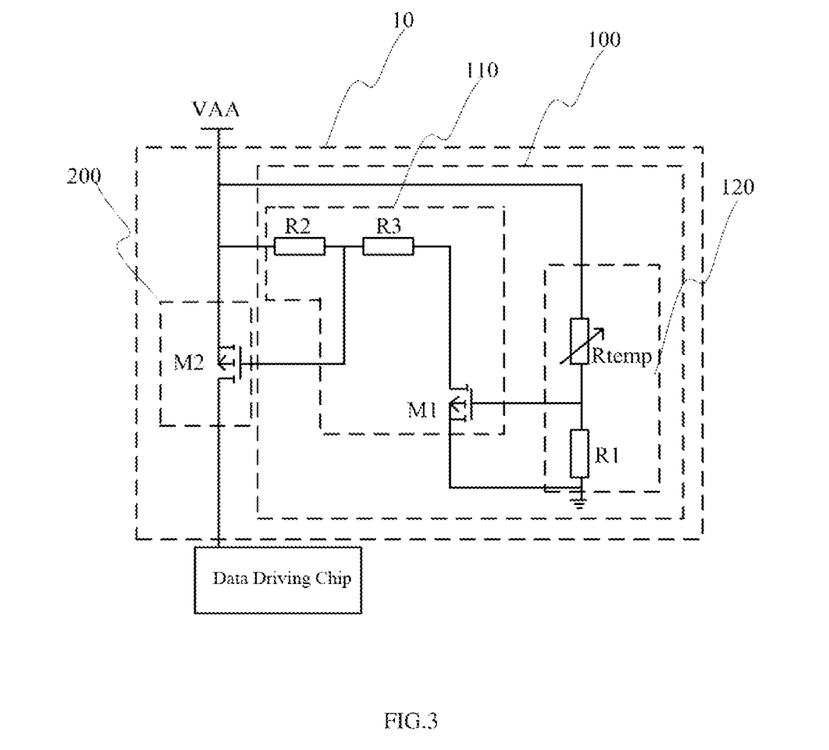
FIG. 3 is a schematic structural diagram of another protection circuit according to an embodiment of the present disclosure.

In one embodiment, referring to FIG. 3, the feedback circuit 100 includes a first feedback branch 110 and a second feedback branch 120.

A first input terminal of the first feedback branch 110 is connected to the power source, a second input terminal of the first feedback branch 110 is grounded, the first feedback branch 110 is configured to receive the supply voltage, adjusting a third general resistance value of the first feedback branch 110 according to the temperature of the data driving chip, and generating a feedback control voltage according to the supply voltage and the adjusted third general resistance value. When the temperature of the data driving chip is increased, the third general resistance value is reduced, and the feedback control voltage is increased.

A first input terminal of the second feedback branch 120 is connected with the power source and the first input terminal of the first feedback branch 110. A second input terminal of the second feedback branch 120 is connected with the output terminal of the first feedback branch 110. An output terminal of the second feedback branch 120 is connected to the second input terminal of the current adjusting circuit 200. The second feedback branch 120 is configured to receive the supply voltage and the feedback control voltage output by the first feedback branch 110, adjusting a fourth general resistance value of he second feedback branch 120 according to the feedback control voltage, generating the feedback voltage according to the supply voltage and the adjusted fourth general resistance value, and outputting a feedback voltage to the current adjusting circuit 200. In particular, the feedback voltage is increased with the increase of the feedback control voltage.

In the embodiment, the first feedback branch 110 includes a thermistor RTEMP and a first resistor R1:

one terminal of the thermistor RTEMP is connected with the power source, and the other terminal of the thermistor RTEMP is connected with the second input terminal of the second feedback branch 120.

One terminal of the first resistor R1 is connected with the first resistor R1 and the second input terminal of the second feedback branch 120, and the other terminal of the first resistor R1 is grounded.

It can be understood that when the temperature of the data driving chip is increased, a resistance value of the thermistor RTEMP is reduced, the third general resistance of the first feedback branch 110 (equal to the sum of the resistance values of the first resistor R1 and the thermistor RTEMP) is reduced, the voltage across the first feedback branch 110 is increased, the voltage across the first resistor R1 is increased, and the feedback control voltage is equal to the voltage across the first resistor R1, so the feedback control voltage is increased.

The second feedback branch 120 includes a second resistor R2, a third resistor R3 and a first switch tube M1.

One terminal of the second resistor R2 is connected with the power source, and the other terminal of the second resistor R2 is connected with the second input terminal of the current adjusting circuit 200.

One terminal of the third resistor R3 is connected with the second resistor R2 and the second input terminal of the current adjusting circuit 200, and the other terminal of the third resistor R3 is connected with a source of the first switch tube M1.

A grid of the first switch tube M1 is connected with the first resistor R1 and the thermistor RTEMP, a source of the first switch tube M1 is connected to the third resistor R3, and a drain of the first switch tube M1 is grounded.

It can be understood that when the temperature of the data driving chip is increased, the feedback control voltage is increased, a grid voltage of the first switch tube M1 is increased, the conduction impedance of the first switch tube M1 is increased, the fourth general resistance value (equivalent to the sum of a resistance value of the second resistor R2, a resistance value of the third resistor R3 and an on-impedance of the first switch tube M1) of the second feedback branch 120 is increased, and the current in the second feedback circuit 100 is reduced. The feedback voltage is equal to the voltage across the third resistor R3 and the first switch tube M1, which is equal to a difference between the supply voltage and the voltage across the second resistor R2, so that when the voltage across the second resistor R2 is reduced, the feedback voltage is increased.

In the embodiment the first resistor R1, the second resistor R2 and the third resistor R3 are common resistors with fixed resistance values, and the first switch tube M1 and the second switch tube M2 are both P-type field effect transistors. The first resistor R1 and the thermistor RTEMP are connected in series to form a voltage dividing circuit, to divide the input supply voltage VAA. It is assumed that the voltage across the thermistor RTEMP is VRTEMP, VRTEMP=VAA*RTEMP/(RTEMP+R1). The voltage VRTEMP across the thermistor RTEMP is used as the feedback control voltage to control conduction of the first switch tube M1.

When the data driving chip is in a normal temperature state, the RTEMP is larger, the voltage VRTEMP across the thermistor RTEMP is higher, the grid voltage of the first field effect transistor is small, the conduction impedance RN1 of the first field effect transistor is small, and the conduction condition is good. At this time, the power source is grounded through the second resistor R2, the third resistor R3 and the first switch tube M1, at this moment, the feedback voltage Vf is equal to Vai*(R3+Rn 1)/(R2+R3+Rn 1), Vf is less than VAA, the second switch tube M2 is turned on, and the power source normally supplies power to the data driving chip. When the temperature of the data driving chip is increased, the RTEMP is reduced, the feedback control voltage is increased, the conduction impedance of the first field effect transistor is increased, the feedback voltage Vf is increased, a voltage difference (equal to VAA-Vf) between the grid of the second switch tube M2 and the source is reduced, the conduction impedance RN2 of the second switching tube M2 is increased, and the driving current output by the voltage adjusting circuit is reduced, thereby the thermal energy power consumption of the data driving chip is reduced.

When the data driver chip approaches to be burnt due to abnormal conditions and temperatures, the voltage across the thermistor RTEMP is close to 0. The grid voltage of the first switch tube M1 is VAA, the first switch tube M1 is turned off, the feedback voltage is equal to the supply voltage VAA, the voltage difference between the grid of the second switch tube M2 and the source of the second switch tube M2 is 0, the second switch tube M2 is also turned off. The power source no longer powers the data driving chip, the data driving chip stops working, and a serious consequence of burning is avoided.

Based on a same inventive concept, the present disclosure also provides a power supply circuit including a power source and a protection circuit. The power supply circuit can be used in the overall driving architecture of the ultra-high definition liquid crystal panel, and the situation that the data driving chip is burnt is prevented.

In the embodiment, the protection circuit includes:

a feedback circuit 100 and a current adjusting circuit 200.

A first input terminal of the feedback circuit 100 is connected with a power source, a second input terminal of the feedback circuit 100 being grounded, the feedback circuit 100 is configured to receive a supply voltage, the first general resistance value of the feedback circuit 100 is adjusted according to the temperature of the data driving chip, and a feedback voltage is generated according to the supply voltage and the adjusted first general resistance value.

A first input terminal of the current adjusting circuit 200 is connected to the power source and a first input terminal of the feedback circuit 100. The second input terminal of the current adjusting circuit 200 is connected with the output terminal of the feedback circuit 100. The current adjusting circuit 200 is used for receiving the supply voltage and the feedback voltage. A driving current is generated according to the feedback voltage and the supply voltage, and the driving current is provided to the data driving chip. In particular, the driving current is reduced along with the increase of the temperature of the data driving chip.

In one embodiment, the feedback circuit 100 includes a first feedback branch 110 and a second feedback branch 120.

A first input terminal of the first feedback branch 110 is connected to a power source, and a second input terminal of the first feedback branch 110 is grounded. The first feedback branch 110 is used for receiving the supply voltage. The third general resistance value of the chip is adjusted according to the temperature of the data driving chip, and a feedback control voltage is generated according to the supply voltage and the adjusted third general resistance value. In particular, when the temperature of the data driving chip is increased, the third general resistance value is reduced, and the feedback control voltage is reduced.

A first input terminal of the second feedback branch 120 is connected with the power source and a first input terminal of the first feedback branch 110, a second input terminal of the second feedback branch 120 is connected with an output terminal of the first feedback branch 110, and an output terminal of the second feedback branch 120 is connected with a second input terminal of the current adjusting circuit 200. The second feedback branch 120 is used for receiving the supply voltage and a feedback control voltage output by the first feedback branch 110. A fourth general resistance value of the feedback control voltage is adjusted according to the feedback control voltage. The feedback voltage is generated according to the supply voltage and the adjusted fourth general resistance value, and outputting the feedback voltage to the current adjusting circuit 200, wherein the feedback voltage is increased with the decrease of the feedback control voltage.

The first feedback branch 110 includes a first resistor R1 and a thermistor RTEMP. One terminal of the first resistor R1 is connected with the power source, and the other terminal of the first resistor R1 is connected with a second input terminal of the second feedback branch 120. One terminal of the thermistor RTEMP is connected to the first resistor R1 and the second input terminal of the second feedback branch 120, and the other terminal of the thermistor RTEMP is grounded.

The second feedback branch 120 includes a second resistor R2, a third resistor R3 and a first switch tube M1, one terminal of the second resistor R2 is connected with the power source, and the other terminal of the second resistor R2 is connected with the second input terminal of the current adjusting circuit 200. One terminal of the third resistor R3 is connected with the second resistor R2 and the second input terminal of the current adjusting circuit 200, and the other terminal of the third resistor R3 is connected with the drain electrode of the first switch tube M1. The grid electrode of the first switch tube M1 is connected with the first resistor R1 and the thermistor RTEMP, the drain of the first switch tube M1 is connected with the third resistor R3, and the source of the first switch tube M1 is grounded.

In the embodiment, the current adjusting circuit 200 includes a second switch tube M2, the grid electrode is connected with the second resistor R2 and the third resistor R3, the source electrode is connected with the second resistor R2 and the supply voltage, and the drain electrode is connected with the data driving chip.

In one embodiment, a first input terminal of the first feedback branch 110 is connected with a power source, a second input terminal of the first feedback branch 110 is grounded, the first feedback branch 110 is used for receiving the supply voltage, a third general resistance value of the first feedback branch 110 is adjusted according to the temperature of the data driving chip, and a feedback control voltage is generated according to the supply voltage and the adjusted third general resistance value. In particular, when the temperature of the data driving chip is increased, the third general resistance value is reduced, and the feedback control voltage is increased.

A first input terminal of the second feedback branch 120 is connected to the power source and a first input terminal of the first feedback branch 110. A second input terminal of the second feedback branch 120 is connected to an output terminal of the first feedback branch 110. An output terminal of the second feedback branch 120 is connected to a second input terminal of the current adjusting circuit 200. The second feedback branch 120 is used for receiving the supply voltage and a feedback control voltage output by the first feedback branch 110, adjusting a fourth general resistance value of the feedback control voltage according to the feedback control voltage. The feedback voltage is generated according to the supply voltage and the adjusted fourth general resistance value, and the feedback voltage is output to the current adjusting circuit 200. In particular, the feedback voltage is increased with the increase of the feedback control voltage.

In the embodiment, the first feedback branch 110 includes a thermistor RTEMP and a first resistor R1, one terminal of the thermistor RTEMP is connected to the power source, and the other terminal of the thermistor RTEMP is connected to the second input terminal of the second feedback branch 120. One terminal of the first resistor R1 is connected with the first resistor R1 and the second input terminal of the second feedback branch 120, and the other terminal of the first resistor R1 is grounded.

The second feedback branch 120 includes a second resistor R2, a third resistor R3 and a first switch tube M1, one terminal of the second resistor R2 is connected with the power source, and the other terminal of the second resistor R2 is connected with the second input terminal of the current adjusting circuit 200. One terminal of the third resistor R3 is connected with the second resistor R2 and the second input terminal of the current adjusting circuit 200, and the other terminal of the third resistor R3 is connected with the source electrode of the first switch tube M1. The grid electrode of the first switch tube M1 is connected with the first resistor R1 and the thermistor RTEMP, the source electrode of the first switch tube M1 is connected with the third resistor R3, and the drain electrode of the first switch tube M1 is grounded.

Based on the same inventive concept, the present disclosure also provides a display panel including a display area and a peripheral circuit area. The display area is used for displaying. The peripheral circuit area is used for supplying power to the display area and providing a driving signal, and the peripheral circuit area includes a protection circuit.

The power supply circuit includes a feedback circuit 100 and a current adjusting circuit 200.

A first input terminal of the feedback circuit 100 is connected with a power source, a second input terminal of the feedback circuit 100 being grounded, the feedback circuit 100 is used for receiving a supply voltage, the first general resistance value of the feedback circuit 100 is adjusted according to the temperature of the data driving chip, and a feedback voltage is generated according to the supply voltage and the adjusted first general resistance value.

A first input terminal of the current adjusting circuit 200 is connected to the power source and a first input terminal of the feedback circuit 100. The second input terminal of the current adjusting circuit 200 is connected with the output terminal of the feedback circuit 100. The current adjusting circuit 200 is used for receiving the supply voltage and the feedback voltage. A driving current is generated according to the feedback voltage and the supply voltage, and the driving current is provided to the data driving chip. In particular, the driving current is reduced along with the increase of the temperature of the data driving chip.

In summary, the present disclosure provides a protection circuit, a power supply circuit and a display panel. The protection circuit 10 includes a feedback circuit 100 and a current adjusting circuit 200, with a first input terminal of the feedback circuit 100 being connected with a power source, a second input terminal of the feedback circuit 100 being grounded, and being used for receiving a supply voltage, the first general resistance value of the feedback circuit 100 is adjusted according to the temperature of the data driving chip, and a feedback voltage is generated according to the supply voltage and the adjusted first general resistance value. A first input terminal of the current adjusting circuit 200 is connected to the power source and a first input terminal of the feedback circuit 100. The second input terminal of the current adjusting circuit 200 is connected with the output terminal of the feedback circuit 100. The current adjusting circuit 200 is used for receiving the supply voltage and the feedback voltage. A driving current is generated according to the feedback voltage and the supply voltage, and the driving current is provided to the data driving chip. In particular, the driving current is reduced along with the increase of the temperature of the data driving chip. The feedback circuit 100 generates a feedback voltage according to the temperature of the data driving chip, so that the current adjusting circuit 200 adjusts the driving current output according to the feedback circuit 100. In particular, when the temperature of the data driving chip is increased, the driving current is reduced, and the power consumption of the data driving chip is reduced, so that the data driving chip is prevented from being burnt out due to excessive internal temperature.

The technical features of the embodiments described above can be combined in any combination, to make the description is concise, not all possible combinations of the technical features in the above embodiments are described. However, as long as a combination of the technical features does not conflict, it should be considered the combination falls within the scope of the present specification.

The embodiments described above only express several embodiments of the present disclosure, which are described in more details, but are not therefore to be construed as limiting the scope of the disclosure. It should be noted that several variations and modifications can be made to one of ordinary skills in the art without departing from the inventive concept, all of which fall within the scope of the present disclosure. Therefore, the scope of protection of the present disclosure should be controlled by the appended claims.

The invention claimed is:

1. A protection circuit, comprising:
    a feedback circuit, with a first input terminal being connected with a power source, and a second input terminal being grounded, and configured to receive a supply voltage, adjusting a first general resistance value of the feedback circuit according to a temperature of a data driving chip, and generating a feedback voltage according to the supply voltage and the adjusted first general resistance value; and, a current adjusting circuit, with a first input terminal being connected with the power source and the first input terminal of the feedback circuit, and a second input terminal being connected with the output terminal of the feedback circuit, and configured to receive the supply voltage and the feedback voltage, generating a driving current according to the feedback voltage and the supply voltage, and providing the driving current to the data driving chip, wherein, the driving current is reduced when the temperature of the data driving chip is increased; wherein, the feedback circuit comprises:

a first feedback branch, with a first input terminal being connected with the power source, and a second input terminal being grounded, and configured for receiving the supply voltage, adjusting a third general resistance value of the first feedback branch according to the temperature of the data driving chip, generating a feedback control voltage according to the supply voltage and the adjusted third general voltage value, wherein, when the temperature of data driving chip is increased, the third general resistance value is reduced, and the feedback control voltage is reduced or increased; and, a second feedback branch, with a first input terminal being connected with the power source and the first input terminal of the first feedback branch, the second input terminal being connected with the output terminal of the first feedback branch, and an output terminal being connected with the second input terminal of the current adjusting circuit, and configured for receiving the supply voltage and the feedback control voltage output by the first feedback branch, adjusting a fourth general resistance value of its own according to the feedback control voltage, generating the feedback voltage according to the supply voltage and the adjusted fourth general resistance value, and outputting the feedback voltage to the current adjusting circuit, wherein, when the feedback control voltage is reduced or increased, the feedback voltage is increased.

2. The protection circuit of claim 1, wherein the first feedback branch comprises:

a first resistance, with a terminal of the resistance being connected with the power source, and another terminal being connected with the second input terminal of the second feedback branch; and, a thermistor, with a terminal of the thermistor being connected with the second output terminal of the second feedback branch, and another terminal being grounded.

3. The protection circuit of claim 2, wherein, the second feedback branch comprises:

a second resistance, with a terminal being connected with the power source, and another terminal being connected with a second input terminal of the current adjusting circuit;

a third resistance, with a terminal of the third resistance terminal being connected with the second resistance and the second input terminal of the current adjusting circuit, and another terminal being connected with a drain of a first switch tube; and the first switch tube, with a grid being connected with the first resistance and the thermistor, the drain being connected with the third resistance, and a source being grounded.

4. The protection circuit of claim 3, wherein the thermistor is a negative temperature coefficient thermistor.

5. The protection circuit of claim 4, wherein the current adjusting circuit comprises a second switch tube with a grid being connected with the second resistance and the third resistance, a source being connected with the second resistance and the supply voltage, and a drain being connected with the data driving chip.

6. The protection circuit of claim 1, wherein the first feedback branch comprises:

a thermistor, with a terminal being connected with the power source, another terminal being connected with the second input terminal of the second feedback branch; and a first resistance, with a terminal being connected with the first resistance and the second input terminal of the second feedback branch, and another terminal being grounded.

7. The protection circuit of claim 6, wherein the second feedback branch comprises:

a second resistance, with a terminal being connected with the power source, and another terminal being connected with the second input terminal of the current adjusting circuit;

a third resistance, with a terminal being connected with the power source, and the second input terminal of the circuit adjusting circuit, and another terminal being connected with a source electrode of a first switch tube; and the first switch tube, with a grid electrode being connected with the first resistance and the thermistor, the source electrode being connected with the third resistance, and a drain electrode grounded.

8. The protection circuit of claim 7, wherein the current adjusting circuit comprises a second switch tube, with a grid electrode being connected with the second resistance and the third resistance, a source electrode being connected with the second resistance and the supply voltage, a drain electrode being connected with the data driving chip.

9. A power supply circuit, the power supply circuit comprising a power source and a protection circuit; wherein the protection circuit comprises:

a feedback circuit, with a first input terminal being connected with a power source, a second input terminal being grounded and being used for receiving a supply voltage, wherein based on a temperature of a data driving chip, a first general resistance value of its own is adjusted, further, based on the supply voltage and the adjusted first general resistance value, a feedback voltage is generated; and, a circuit adjusting circuit, with a first input terminal being connected with the power source and the first input terminal of the feedback circuit, a second input terminal being connected with the output terminal of the feedback circuit and being used for receiving the supply voltage and the feedback voltage, wherein based on the feedback voltage and the supply voltage, a driving current is generated and provided to the data driving chip, wherein the driving current is reduced when the temperature of the data driving chip is increased;

wherein, the feedback circuit comprises:

a first feedback branch, with a first input terminal being connected with the power source, and a second input terminal being grounded, and configured for receiving the supply voltage, adjusting a third general resistance value of the first feedback branch according to the temperature of the data driving chip, generating a feedback control voltage according to the supply voltage and the adjusted third general voltage value, wherein, when the temperature of data driving chip is increased, the third general resistance value is reduced, and the feedback control voltage is reduced or increased; and, a second feedback branch, with a first input terminal being connected with the power source and the first input terminal of the first feedback branch, the second input terminal being connected with the output terminal of the first feedback branch, and an output terminal being connected with the second input terminal of the current adjusting circuit, and configured for receiving the supply voltage and the feedback control voltage output by the first feedback branch, adjusting a fourth general resistance value of its own according to the feedback control voltage, generating the feedback voltage according to the supply voltage and the adjusted fourth general resistance value, and outputting the feedback voltage to the current adjusting circuit, wherein, when the feedback control voltage is reduced or increased, the feedback voltage is increased.

10. The power supply circuit of claim 9, wherein the first feedback branch comprises:
a first resistance, with a terminal being connected with the power source, another terminal being connected with the second input terminal of the second feedback branch; and,
a thermistor, with a terminal being connected with the first resistance and the second input terminal of the second feedback branch, and another terminal being grounded.

11. The power supply circuit of claim 10, wherein the second feedback branch comprises:
a second resistance, with a terminal being connected with the power source, another terminal being connected with the second input terminal of the current adjusting circuit;
a third resistance, with a terminal being connected with the second resistance and the second input terminal of the current adjusting circuit, another terminal being connected with a drain electrode of a first switch tube; and,
the first switch tube, with a grid electrode being connected with the first resistance and the thermistor, the drain electrode being connected with the third resistance, and a source electrode being grounded.

12. The power supply circuit of claim 11, wherein the thermistor is a negative temperature coefficient thermistor.

13. The power supply circuit of claim 9, wherein the first feedback branch comprises:
a thermistor, with a terminal being connected with the power source, another terminal being connected with the second input terminal of the second feedback branch; and,
a first resistance, with a terminal being connected with the first resistance and the second input terminal of the second feedback branch, another terminal being grounded.

14. The power supply circuit of claim 13, wherein the second feedback branch comprises:

a second resistance, with a terminal being connected with the power source, and another terminal being connected with the second input terminal of the current adjusting circuit;
a third resistance, with a terminal being connected with the second resistance and the second input terminal of the current adjusting circuit, another terminal being connected with a source electrode of a first switch tube; and,
the first switch tube, with a grid electrode being connected with the first resistance and the thermistor, the source electrode being connected with the third resistance, and a drain electrode being grounded.

15. The power supply circuit of claim 14, wherein the current adjusting circuit comprises a second switch tube, with a grid electrode being connected with the second resistance and the third resistance, a source electrode being connected with the second resistance and the supply voltage, a drain electrode being connected with the data driving chip.

16. A display panel, comprising:
a display area, configured to display; and,
a surrounding circuit area, configured to provide power and a driving signal to the display area, wherein the surrounding circuit area comprises a protection circuit;
wherein, the protection circuit comprises:
a feedback circuit, with a first input terminal being connected with a power source, a second input terminal being grounded and being used for receiving a supply voltage, wherein based on a temperature of a data driving chip, a first general resistance value of its own is adjusted, further, based on the supply voltage and the adjusted first general resistance value, a feedback voltage is generated; and,
a current adjusting circuit, with a first input terminal being connected with the power source, a second input terminal being connected with the output terminal of the feedback circuit and being used for receiving the supply voltage and the feedback voltage, wherein based on the feedback voltage and the supply voltage, a driving current is generated and is further provided to the data driving chip, wherein the driving current is reduced when the temperature of the data driving chip is increased;
wherein,
the feedback circuit comprises:
a first feedback branch, with a first input terminal being connected with the power source, and a second input terminal being grounded, and configured for receiving the supply voltage, adjusting a third general resistance value of the first feedback branch according to the temperature of the data driving chip, generating a feedback control voltage according to the supply voltage and the adjusted third general voltage value, wherein, when the temperature of data driving chip is increased, the third general resistance value is reduced, and the feedback control voltage is reduced or increased; and, a second feedback branch, with a first input terminal being connected with the power source and the first input terminal of the first feedback branch, the second input terminal being connected with the output terminal of the first feedback branch, and an output terminal being connected with the second input terminal of the current adjusting circuit, and configured for receiving the supply voltage and the feedback control voltage output by the first feedback branch, adjusting a fourth general resistance value of its own according to the feedback control voltage, generating the feedback voltage according to the supply voltage and the adjusted fourth general resistance value, and outputting the feedback voltage to the current adjusting circuit, wherein, when the feedback control voltage is reduced or increased, the feedback voltage is increased.

* * * * *